United States Patent [19]

Angelillo

[11] Patent Number: 4,712,577
[45] Date of Patent: Dec. 15, 1987

[54] PNEUMATIC VALVE FOR BRAKING SYSTEMS

[75] Inventor: Domenico Angelillo, Sesto San Giovanni, Italy

[73] Assignee: Industrie Magneti Marelli S.r.l., Milan, Italy

[21] Appl. No.: 33,383

[22] Filed: Apr. 2, 1987

[30] Foreign Application Priority Data

Apr. 2, 1986 [IT] Italy ................................ 53220/86[U]

[51] Int. Cl.⁴ .................... F16K 11/22; F16K 31/143; B60T 15/06
[52] U.S. Cl. .................................. 137/270; 137/627.5; 251/63.4; 251/62
[58] Field of Search ............... 137/627.5, 270; 251/62, 251/63.4, 63.5

[56] References Cited

U.S. PATENT DOCUMENTS 3,464,742  9/1969  Cruse ........................ 137/625.5 X
3,606,494  9/1971  Frank et al. ................. 137/625.5 X
4,258,741  3/1981  Roger ............................. 137/270

FOREIGN PATENT DOCUMENTS 0083762  5/1982  Japan ........................... 251/62

Primary Examiner—Arnold Rosenthal
Attorney, Agent, or Firm—Sughrue, Mion, Zinn, Macpeak & Seas

[57] ABSTRACT

The valve comprises a body with an inlet connector and an outlet connector for connection to a pressure source and a pneumatic circuit respectively, and with an obturator valve which controls communication between the connectors. The valve has a control device including a piston sealingly slidable in a guide portion of the body between a first chamber which can be put into communication with a pressure source and a second chamber housing a valve so that the piston can move and open the valve under the effect of the pressure in the first chamber. The guided portion of the piston is generally cylindrical and has a smaller cross-section than the passage cross-section of the guide portion of the body. An intermediate member is sealingly interposed between the guided portion of the piston and the guide portion of the body. The intermediate member has stop means and is locatable between the wall of the body and the guided portion of the piston in the first or second orientations, in which the stop means respectively allow and prevent the movement with the piston under the effect of the pressure in the chamber.

2 Claims, 3 Drawing Figures

PNEUMATIC VALVE FOR BRAKING SYSTEMS

The present invention relates to a pneumatic valve for braking systems.

In particular, the invention concerns a pneumatic valve comprising a body with an inlet connector and an outlet connector for connection to a pressure source and a pneumatic circuit respectively, and with an obturator valve which controls communication between the connectors and a control device for the valve, including a piston sealingly slidable in a guide portion of the body between a first chamber which can be put into communication with a pressure source and a second chamber housing the valve so that the piston can move and open the valve under the effect of the pressure in the first chamber.

The object of the invention is to provide a pneumatic valve of the aforesaid type, which, with a simple, quick and cheap modification, enables two different values to be obtained for the ratio between the magnitude of the command and the pressure supplied to the pneumatic circuit through the outlet connector.

This object is achieved according to the invention by means of a pneumatic valve of the type specified above, the main characteristic of which lies in the fact that the guided portion of the piston is generally cylindrical and has a smaller cross-section than the passage cross-section of the guide portion of the body, and in that an intermediate member is sealingly interposed between the guided portion of the piston and the guide portion of the body, the intermediate member having stop means and being locatable between the wall of the body and the guided portion of the piston in first or second orientations, in which the stop means respectively allow and prevent its movement with the piston under the effect of the pressure in the chamber.

In the valve according to the invention, when the intermediate member is disposed in the first orientation it moves with the control piston, as if it were a part of it, and the force acting on the piston as a result of the pressure supplied to the first chamber is thus increased. When the intermediate member is in the second orientation, however, it is anchored to the body of the valve, as if it were a part of it, and is not able to transfer the force exerted thereon by the pressure in the first chamber to the piston.

It is thus possible to arrange the valve according to the invention to operate with two different values of the ratio between the intensity of the command and the pressure supplied to the pneumatic user circuit through the outlet connector, simply by assembly of the intermediate member in the first or the second orientation.

Further characteristics and advantages of the device according to the invention will become apparent from the detailed description which follows with reference to the appended drawings, provided purely by way of non-limiting example, in which.

Figure 3:
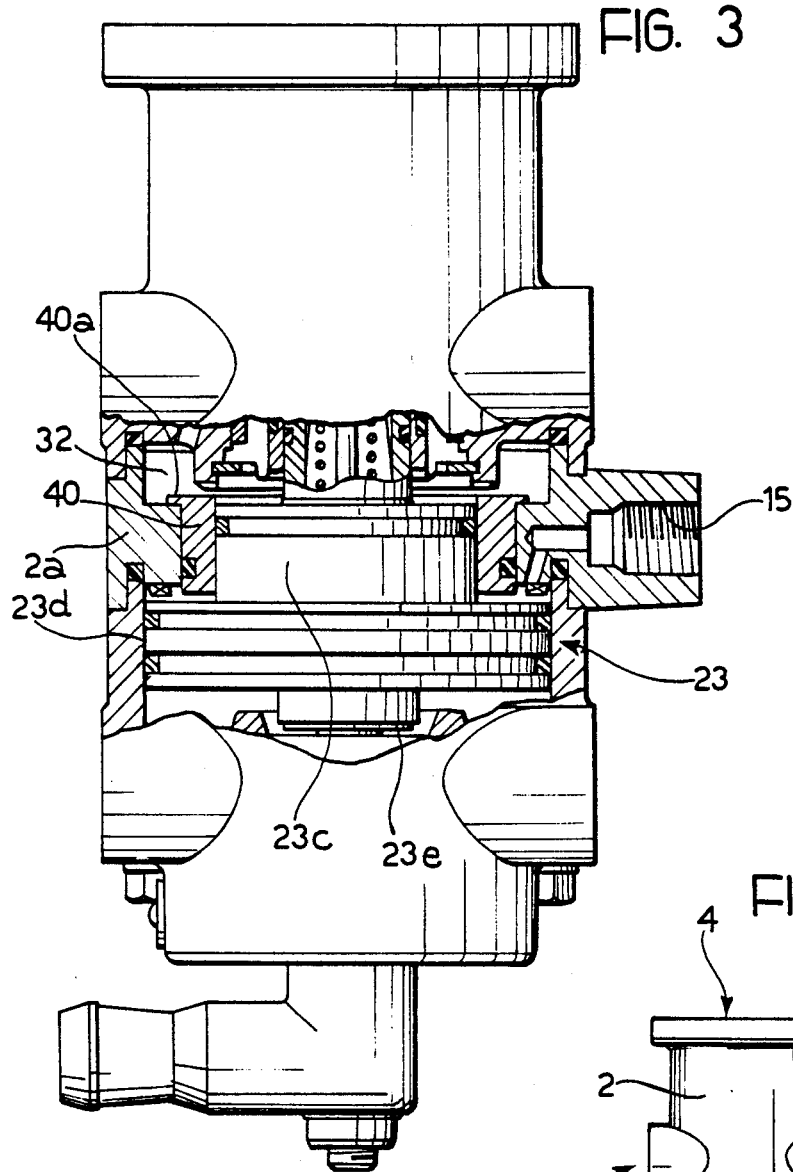
FIGS. 2 and 3 are two sections of the device shown in FIG. 1, with an annular member located in first and second orientations respectively.
Figure 1:
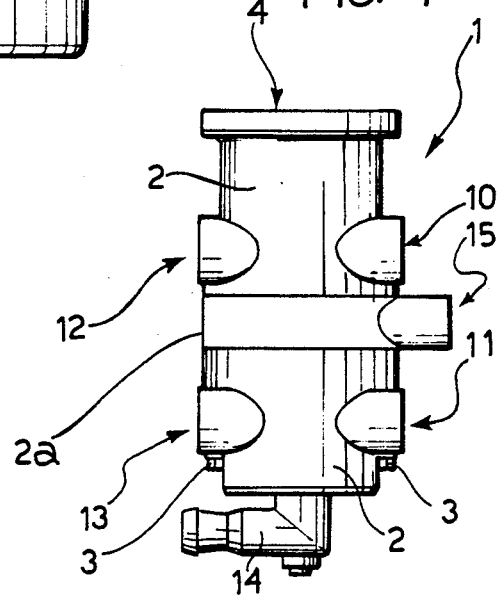
FIG. 1 is a side view of a pneumatic distributor of the duplex type.

With reference to the drawing, a pneumatic duplex distributor is generally indicated 1 and is of the type intended for use in the braking system of a vehicle with at least two axles, of which the rear one has a brake corrector. More particularly, the distributor illustrated is of the type incorporating a modulator for modulating the brake pressure applied to the front axle.

The distributor illustrated includes a body 2 formed in three parts which are coupled together sealingly and clamped by screws 3. The body 2 has an upper aperture 4 in which a cup-shaped piston 5 is sealingly movable. A drive cap 6 is mounted in the piston and can be operated as a result of the operation of the brake pedal in known manner, not illustrated. Between the cap 6 and the piston 5 are springs 7, 8 and 9.

Two inlet connectors 10, 11 and corresponding outlet connectors 12, 13 are formed in the body 2. The connectors 10 and 11 are intended for connection to two pressure reservoirs, while the connectors 12 and 13 are intended for respective connection to the rear brake circuit (through a brake modulator device, not illustrated) and to the front brake circuit of a motor vehicle.

The body 2 also has an exhaust connector 14 at its bottom. The middle part of the body 2 has a further inlet connector 15 for connection to the brake connector with which the rear brake circuit of the vehicle is provided.

In the body 2, between the inlet connector 10 and the outlet connector 12, is a valve comprising a seat 16 and an annular obturator 17 movable along the axis of the control piston 5. At its upper end, the obturator 17 carries an annular washer 18 at its upper end which cooperates with the valve seat 16.

Similarly, between the inlet connector and the outlet connector 13 is a second valve comprising a seat 19 and an annular obturator 20 movable along the axis of the control piston 5. This obturator carries a washer which cooperates with the valve seat 19. A helical spring 22 urges the obturator 20 against the valve seat 19.

In the middle part of the body 2a is sealingly slidable an annular piston 23 with a central tubular portion 23a sealingly slidable in the obturator 17. A spring 24 is interposed between a shoulder at the upper end of the obturator 17 and a shoulder of the portion 23a of the piston 23. The spring 24 biases the piston 23 downwardly.

The tubular hub 23a of the piston 23 has an essentially frusto-conical upper extension 23b with lateral slots. This extension extends into the obturator 17 and has a central aperture 25 in its upper wall facing the control piston 5.

A screw, indicated 26, has one end engaged in a central threaded aperture in the control piston 5. The stem of this screw extends coaxially within the tubular hub 23a of the piston 23. Two tubular reaction members, indicated 27 and 28, are movable longitudinally on this screw and between them is a helical spring 29 urging them apart. The upper reaction member 27 is in the form of a tubular sleeve and is movable through the aperture 25 in the top portion of the piston 23. In the rest condition (no braking) this reaction member bears at its upper end against the control piston 5. The reaction member has an external annular projection which bears against the top wall of the portion 23b of the piston 23.

The lower reaction member 28 bears against the head 26a of the screw 26 and projects beyond the head of this screw, extending towards a tubular frusto-conical projection 30 which extends in the body 2 to the mouth of the exhaust connector 14.

The helical spring 29, through the upper reaction member 27, urges the piston 23 upwardly against the action of the spring 24.

A passage 31 puts the outlet connector 12 into communication with a chamber 32 beneath the piston 23. This piston has an intermediate cylindrical portion 23c which can move in a guided manner with respect to the middle part 2a of the body 2 of the distributor. Finally, the piston 23 has a lower guided portion 23d whose lower surface constitutes the top of a chamber 33.

The inlet connector 15 communicates with a chamber 34 above the lower guided portion 23d of the piston 23. As apparent from the drawing, this guided portion 23d has a greater diameter than the intermediate guide portion 23c.

The control piston has a central annular projection 5b which can cooperate with the washer 18 of the obturator 17 by way of a valve seat to disconnect the outlet connector 12 from the exhaust connector 14 during braking, as will be apparent below. In the rest position of the distributor (no braking) a helical spring 35 keeps the piston 5 in the position illustrated in FIG. 2, in which the projection 5d is located at a certain distance from the annular obturator 17.

Similarly, the tubular hub 23a of the piston 23 has a lower projection 23e which can cooperate with the washer 21 of the obturator 20 by way of a valve seat to disconnect the outlet connector 13 from the exhaust connector 14 during braking. In the rest condition of the distributor, as a result of the equilibrium between the springs 24 and 29, the piston 23 is kept in the position illustrated in FIG. 2, in which the projection 23e is at a certain distance from the washer 21 of the obturator 20.

Figure 2:
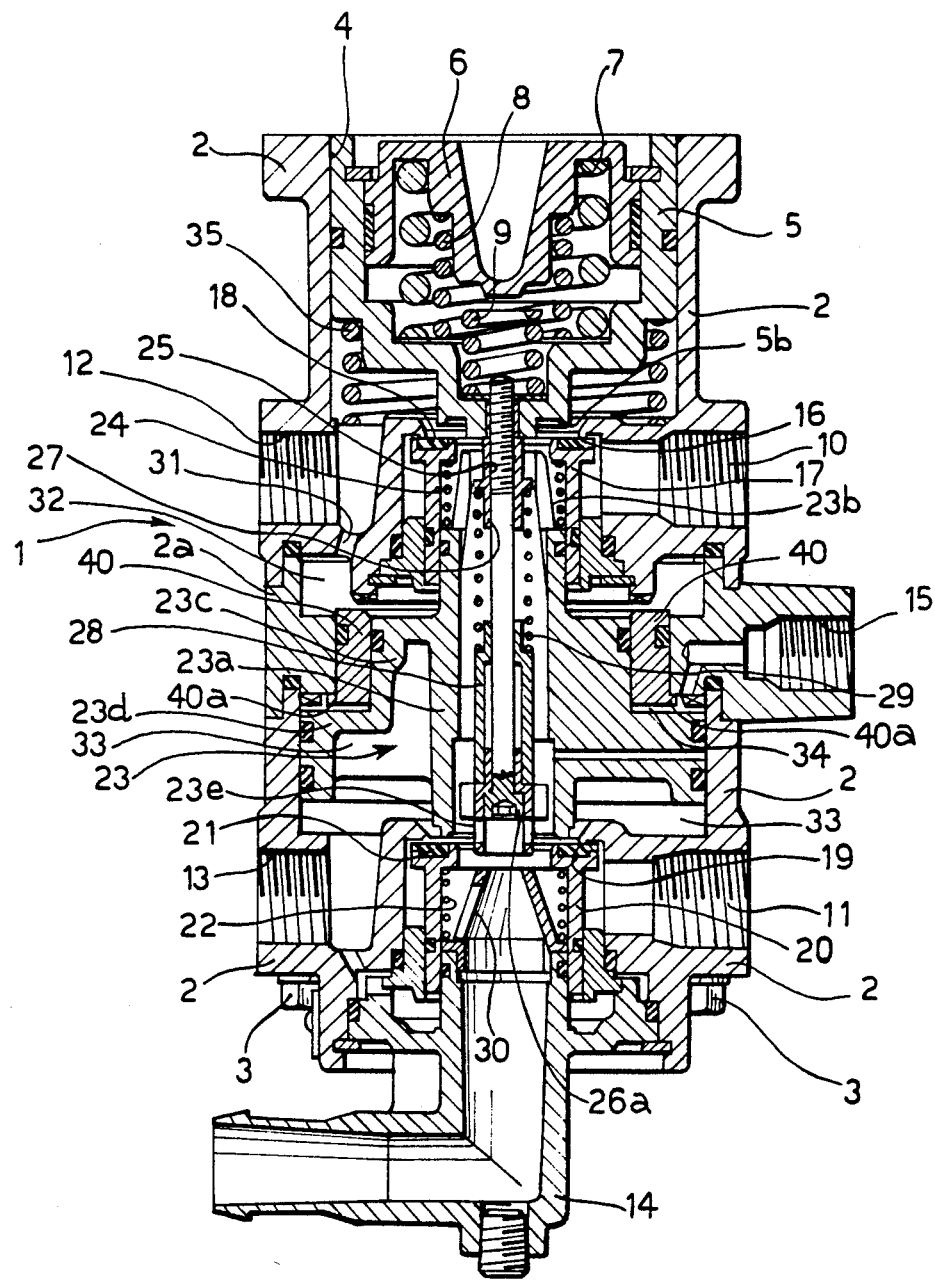

As particularly apparent from FIG. 2, the guided intermediate portion 23c of the piston 23 has a smaller cross-section than the corresponding passage cross-section of the middle portion 2a of the body 2. In the embodiment illustrated, the portion 23c of the piston 23 and the intermediate portion 2a of the body 2 together define an annular interspace in which an annular member 40 is sealed. The annular member 40 has an annular projection 40a projecting from its outer lateral surface at one end. In the assembly shown in FIG. 2, this projection extends into the chamber 34, beneath the intermediate portion 2a of the body 2 of the distributor. In this condition of assembly, the annular member 40 may move downwardly with the piston 23, as a result of a control pressure entering the chamber 32.

The distributor described above operates in the following manner.

The operation of the brake pedal causes the lowering of the cap 6 which, through the springs 7 and 8, causes lowering of the piston 5 and its extension represented by the screw 26. The reaction members 27 and 28 move with the screw 26, and the spring 29 is not initially stressed. The sping 24 is extended pushing the piston 23 downwardly. The edge 5b of the control piston 5 comes into contact with the obturator 16 and interrupts communication between the outlet connector 12 and the exhaust 14. At almost the same time, the lower reaction member 28 comes into contact with the frusto-conical member 30 fixed to the body 2 and is arrested relative to the screw 26 which is again able to descend downwardly. The further lowering of the piston 5 thus causes compression of the spring 29. The further descent of the control piston 5 causes movement of the obturator 17 away from the valve seat 16 so that the pressure is propagated from the inlet connector 10 to the outlet connector 12. The chamber 32 is also pressurised through the passage 31 and the resulting force on the piston 23 causes it to move downwardly, which means that the obturator 20 moves away from the valve seat 19 to put the connector 11 into communication with the outlet connector 13. The pressure entering into the chamber 32 also acts on the annular member 40. This member transfers the force exerted thereon by the pressure in the chamber 32 to the piston 23.

When the brake pedal is released, the spring 33 forces the piston 5 upwardly again and, under the action of the springs 22, 24 and 29, the piston 23 and the obturators 17 and 20 return to the condition illustrated in FIG. 2.

FIG. 3 shows the same distributor described with reference to FIG. 2 but with the annular member 40 mounted upside down around the intermediate guided portion 23d of the piston 23. In this case, the projection 40a of the annular member 40 prevents the descent of the latter with the piston 23 as a result of the pressure entering the chamber 32 when braking is effected. Consequently, with the ring 40 mounted in the manner illustrated in FIG. 3, for the same pressure supplied to the chamber 32 (and hence with the same intensity of the brake command) during braking, the force acting on the piston 23 is less in that the ring 40 cannot transfer any force to the piston this time.

From what has been explained above, it is clear that the distributor will have two different predetermined values of the ratio between the intensity of the command and the pressure effectively supplied to the brake actuators of the front axle through the outlet connector 13, depending on whether the ring 40 is mounted in the manner illustrated in FIG. 2 or in FIG. 3.

The invention thus enables two distributors to be made with different characteristics by using the same components, and in particular, simply by modifying the arrangement of the annular member 40 during assembly.

Naturally, the invention extends to those embodiments which achieve equal utility by the same innovative concept.

In particular, it is not intended that the invention should be limited absolutely to the embodiment described in the foregoing description.

I claim:

1. Pneumatic valve, particularly for braking systems, comprising a body with an inlet connector and an outlet connector for connection to a pressure source and a pneumatic circuit respectively, and with an obturator valve which controls communication between the connectors and a control device for the valve, including a piston sealingly slidable in a guide portion of the body between a first chamber which can be put into communication with a pressure source and a second chamber housing the valve, so that the piston can move and open the valve under the effect of the pressure in the first chamber characterised in that the guided portion of the piston is generally cylindrical and has a smaller cross-section than the passage cross-section of the guide portion of the body, and in that an intermediate member is sealingly interposed between the guided portion of the piston and the guide portion of the body, the intermediate member having stop means and being locatable between the wall of the body and the guided portion of the piston in first or second orientations, in which the stop means respectively allow and prevent its movement with the piston under the effect of the pressure in the chamber; the intermediate member being able to transfer to the piston the force exerted thereon by the pressure in the first chamber, in its first orientation.

2. Valve according to claim 1, characterised in that the intermediate member is constituted by a ring and in that the stop means are constituted by a peripheral projection of the ring.

* * * * *